United States Patent Office 2,743,515
Patented May 1, 1956

2,743,515
WELD BACKINGS AND METHOD OF WELDING BY USE OF SAME

Fred Davis, Lynn, William Bernard Penn, Marblehead, and Daniel Wood Puffer, Melrose, Mass., assignors to General Electric Company, a corporation of New York No Drawing. Application November 9, 1951, Serial No. 255,752

9 Claims. (Cl. 29—491)

Our invention relates to weld backings used for minimizing oxidation of the back surfaces of an assembly of parts at the seam or joint between them during a welding operation performed by applying a welding agency along the front surfaces of the parts at the seam to fuse their edges and form a weld between them. By preventing or greatly eliminating oxidation at the back of the same, weld penetration is more uniform and the molten weld metal is more effectively held in place in the weld by its surface tension.

When metal parts are being fabricated by any of the arc or gas welding processes, it is quite often necessary to back up or shield the under side of the joint which is being welded to protect the weld metal from oxidation by excluding air. This back up in some cases is a gas as for example, in atomic hydrogen welding. In atomic hydrogen welding, the upper side of the weld is shielded with hydrogen which is supplied across an arc where it disassociates forming a "flame" of atomic hydrogen which recombines at the weld into molecular hydrogen with the liberation of the heat used in making the weld. When welding with the atomic hydrogen, it has been found that better operating conditions are established by shielding the under side of the weld with hydrogen for the time oxidizing temperatures prevail. This hydrogen shielding of the under side of the weld has proved to be very effective when welding stainless steel and other alloys containing a constituent which would otherwise cause an objectionable film of oxide to form, reducing effective penetration and the effect of surface tension in supporting the liquid weld metal. One method of using hydrogen for this purpose is to provide a welding fixture which supports the work parts and contains a groove spanning the welding zone at the seam between the parts and wide and deep enough to avoid contact with the liquid weld metal formed in making a weld at the seam. Hydrogen fed to this groove at a very low pressure will prevent oxidation of the back surface of the weld with the resultant beneficial effects above noted. In many cases this hydrogen backing will also reduce oxides already present on the work parts.

There are many applications where inert arc welding is preferable to atomic hydrogen welding. In inert arc welding the arc and molten metal of the weld are shielded by an inert gas such as argon or helium. When performing inert arc welding operations, the weld is often protected by an inert gas backing by using fixtures such as described above for use in welding with the atomic hydrogen flame. The inert gas so used inhibits oxidation at the back of the seam but does not have the other desirable characteristic of a hydrogen gas backing referred to above.

Fixtures for supplying gas backings are expensive to make especially when the parts to be welded are of irregular or special shapes. Furthermore, the piping and hose connections to these fixtures may seriously interfere with the welder's manipulation of the work parts during the welding operation. When hydrogen is used as the backing gas there is also the ever present danger of explosions due to the admixture of air with the hydrogen in confined places within the work assembly or jig for the work assembly.

It has also been proposed to paint and thereby shield the back of a welding seam with various flux materials mixed with a liquid vehicle to provide a composition of the desired consistency for application as a coating to the back side of the seam. This substitute for gas shielding imposes certain operating difficulties for in many applications the flux is detrimental to the metal being welded and removal of the flux residue after welding is often very difficult due to the nature of the flux ingredients or the vehicles used in applying the flux to the work. Also there is always the possibility that some of the flux so used will be trapped in the weld and thereby detract from its strength and quality. The use of such flux coatings for weld backings seriously detracts from the advantages of using certain welding procedures such as atomic hydrogen welding and inert arc welding which are frequently employed because they do not require the use of solid fluxes in making the weld.

It is an object of our invention to provide a coating composition which may be painted on the back of the work parts at the welding seam to form a film which is adherent to the work at welding temperatures, which will minimize oxidation of the coated surfaces during welding without imparting carbon to the weld and which, after the welding operation has been performed, is reduced to an ashy residue which may be easily removed from the work parts.

It is also an object of our invention to provide a non-gaseous weld backing which at welding temperatures will release hydrogen gas in sufficient quantity to obtain the beneficial effects of a hydrogen gas backing without however liberating enough hydrogen to interfere with certain types of welding such as inert arc welding.

More specifically, it is an object of our invention to provide a coating composition comprising powdered tantalum hydride dispersed in a carrying medium of silicone bouncing putty which may be adjusted to the desired consistency for application to the welding seam by a suitable solvent which will not introduce carbon into the weld even if welding is performed before the coating has dried upon the work.

Further objects of our invention will become readily apparent to those skilled in the art from the following description thereof.

We have found that silicone bouncing putty dissolved in a solvent therefor and painted on the back of a weld will protect the weld metal from oxidation during welding, assist in weld penetration, minimize melt throughs, and stabilize arc performance. The silicon bouncing putty is heat resistant and tightly adheres to the work at welding temperatures. After being exposed to the heat of the weld, it is reduced to an ashy residue which is easily removed from the work as by wiping with a dry cloth. It has a further desirable characteristic that when subjected to the welding heat, it does not impart a carbon pickup to the weld.

Silicone bouncing putty has an excellent body just like a high quality paint, which is easily controlled by the amount of solvent or vehicle used for controlling its viscosity. Any of the readily volatile petroleum spirits which act as a solvent or diluent for the silicone bouncing putty may be used as well as other solvents therefor such as xylene, naphtha, toluene, dibutyl ether and the like. The solvent forms a solution of the silicone and a dispersion of its filler so that a colloidal solution is obtained.

The viscosity of such a mixture is controlled by the amount of solvent used subject, however, to the presence of water in the mixture. More than two-tenths of one percent of water will reduce its viscosity to such an extent as to render it useless for its intended purpose. We, consequently, compound the mixture under conditions which eliminate this water content and store the mixture prior to use and during use so that it cannot pick up moisture from the atmosphere.

Although the silicone bouncing putty is in itself a good backing mtaerial for the reasons pointed out above, we prefer to add thereto a hydrogen liberating compound so as to form a hydrogen backing for the weld. We have determined that tantalum hydride as an addition in the silicone bouncing putty will secure the desired hydrogen backing of the weld, when the backing containing it is subjected to the heat of the welding operation. The tantalum hydride is held in suspension in the paint-like mixture formed by the silicone bouncing putty and its solvent.

A preferred composition which we have used includes the following ingredients:

| | | |
|---|---|---|
| Silicone bouncing putty | grams | 28–32 |
| Tantalum hydride | do | 11–13 |
| Xylene | milliliters | 70–80 |

In order to keep the water content of this coating composition below two-tenths of one percent, the ingredients are dried before being mixed. Thus, for example, the silicone bouncing putty may be heated for three or four hours at 100 to 110° F. This heating will also reduce its viscosity which is then further reduced by adding thereto and mixing therewith a small amount of a solvent which has also been dried. In the above formula, the solvent of course is xylene. Thereafter, the rest of the solvent is added and mixed to form a coating compound which, as pointed out above, may be used as a weld backing. The tantalum hydride ingredient is then added as a dry powder. The powder we have used will pass through a screen having a mesh size of .150, that is made of wires .003 inch in diameter which are spaced to provide openings betweeen them of .0037 inch. This powder is held as a suspension in the colloidal solution formed by the silicone bouncing putty and its solvent.

When using our backing material the parts are assembled by tack welding at points along the seam or by straps which bridge, span or clamp parallel to the joint and are attached to the parts on opposite sides of the seam. Our coating composition is then applied along the back of the seam by means of a brush or spreading instrument and then welding is performed along the other side of the seam in the usual manner. In some instances, where the back of the weld is inaccessible after assembly or for other reasons, the backing material may be applied to the back of the weld areas before the parts are assembled without impairing its effectiveness in any way. Thus, the use of costly jigs including weld backing grooves for supplying a gas backing is completely eliminated. Although desirable, it is not necessary to allow the backing coating to dry before welding since the desired action is obtained whether the coating is wet or dry. Usually drying time is quite short if a highly volatile solvent such as naphtha is used. We do not consider our backing to be a flux but have thought of it as a hydrogen backing or gas shield which comes out of a paint can or tube instead of a steel tank for in reality that is just what it is. Photomicrographs of cross sections of welds made when using our weld backing material show a grain structure identical to that of a weld made by using a hydrogen gas backing. In inert arc welding our backing material gives penetration averages that are better than those obtained with an inert gas backing such as helium. Our backing has been used with excellent results in welding supercharger nozzle boxes made of stainless steel. For development work our backing saves large sums of money and considerable time which would otherwise be spent on fabricating temporary fixtures. For production work our backing is also a great money saver and welding operators much prefer it to the heretofore used jigs which were required for obtaining a gas backing.

The silicone bouncing putty ingredient of our coating composition is an organosiliconoxide polymer of the character disclosed in United States Letters Patents 2,431,878—Rob Roy McGregor and Earl Leathen Warrick, December 2, 1947, and 2,541,851—James G. E. Wright, February 13, 1951. It is frequently identified as putty or silicone putty but is referred to herein as silicone bouncing putty, a commonly accepted name therefor. It is the product of the reaction under heat of a mixture of ingredients comprising an organopolysiloxane, for example, a dimethyl polysiloxane, with a boron compound containing both boron and oxygen such as, for instance, boric acid, pyroboric acid, boron oxide and the like to which a filler has been added such as lithopone.

The silicone bouncing putty which we have used is prepared in the following manner. Dimethyl silicone oil containing an average of from 1.9 to 2.0 methyl groups per silicon atom obtained by hydrolyzing a dimethyl dihydrolyzable silane for example, dimethyl dichlorosilane, either pure or containing small amounts of methyltrichlorosilane, for example, 0.1 to 1 mol percent methyltrichlorosilane, is mixed with following ingredients in the stated percentages by weight:

| Silicone oil: | Percent by weight of oil used |
|---|---|
| Partially dehydrated boric acid [1] | 7 |
| $FeCl_3 \cdot 6H_2O$ | 0.1 |

[1] The boric acid ($H_3BO_3$) is heated at 150° C. for one hour probably to form pyroboric acid ($H_2B_4O_7$).

The oil, the boric acid, and the $FeCl_3 \cdot 6H_2O$ are mixed together and heated at 150° C. for one hour. The mixture is then removed, stirred thoroughly and returned to the 150° C. oven for an additional 24 hours of heating. The silicone gum or product thus formed is then mixed with the following ingredients in the following percentages by weight:

| Silicone gum: | Percent by weight of gum used |
|---|---|
| Lithopone | 15 |
| Glycerol | 2 |
| Pentaerythritol | 1 |
| Red iron oxide | (1) |
| Ferric stearate | 2 |

[1] Sufficient to give desired color.

These last ingredients are mixed together until a homogeneous mass is obtained.

The xylene ingredient of our coating composition is used as a solvent or vehicle for the silicone bouncing putty. The amount of solvent employed is governed by average applications. If the amount of solvent is reduced, the mixture is rather viscous and has poor wetting action when applied to the metal at room temperature. If too much solvent is used the wetting properties of the mixture are excellent but the material is rather thin and does not apply a heavy enough coat. We prefer to employ a mixture that has the viscosity of rubber cement since with such a consistency, the tantalum hydride does not settle out and the coating composition covers the joint evenly.

At welding temperatures the powdered tantalum hydride ingredient of our coating composition releases hydrogen for shielding the back of the weld. At the time of its release, the hydrogen is in a nascent condition and consequently will reduce any oxides already present at the seam. With the tantalum hydride liberating hydrogen, weld penetration is uniform with the weld metal forming a smooth bead having feathered edges where it joins with the solid metal due to the good wetting action imparted to the molten weld metal, burning through or melting through at the seam during welding is inhibited, and the arc is very stable.

Tantalum hydride is available as a black powder or in lumps which may be reduced by grinding to a powder.

It is quite stable at room temperatures and may be stored as a powder without excluding the surrounding atmosphere. Consequently, it is readily handled and requires no special manipulation in compounding it with the other ingredients of our backing material except that it must be dry as pointed out above. The tantalum hydride of our composition is the effective ingredient insofar as the liberation of hydrogen is concerned. The silicone bouncing putty is the dispersion medium therefor and the solvent or vehicle for the silicone putty is employed to secure a paint-like mixture of the desired viscosity so as to apply to the work parts a film or coat of silicone bouncing putty and tantalum hydride of the desired thickness. The silicone bouncing putty is heat resistant and holds the tantalum hydride in place on the work by its adhesion thereto even at the welding temperatures so that the tantalum hydride is acted on by the heat of the weld at the point of welding for liberating hydrogen to form the hydrogen backing for the weld.

When using our composition as a backing, a small flame is formed on the back of the weld immediately opposite the welding agency and this flame travels along the back of the seam in synchronism with the travel of the welding agency along the other side of the seam. This is obviously a flame of burning hydrogen and the correspondence in its position with the point of welding confirms the fact that hydrogen is liberated at the time and place it is required to give the desired hydrogen backing to the weld. If the solvent used has not fully evaporated from the coating mixture prior to welding, it will evaporate due to the heat traveling ahead of the weld and ignite forming flames which dart and flick ahead of the point of welding.

The silicone bouncing putty of our weld backing, which in itself as pointed out above is a good backing material, has the desirable characteristic that it will not impart at welding temperatures a carbon pickup to the weld. The specified solvents for the silicone bouncing putty although hydrocarbons have also been found not to impart a carbon pickup to the weld. As previously stated, any solvent that has not already evaporated by the time welding begins, is evaporated by the heat traveling ahead of the welding operation during welding so as not to be present at the point of welding in any substantial quantity. It is preferable to use a fast drying highly volatile solvent.

As pointed out above, our coating mixture loses its viscosity and becomes useless when as little as two-tenths of one percent of water is present. Consequently, if it is exposed to humid air for any length of time, the tantalum hydride and silicone putty will settle, forming a mud-like deposit with a clear liquid above which is the solvent. This loss of viscosity is apparently a physical action since the mixture may again be restored to a usable condition by adding a drying agent for example, three percent of anhydrous magnesium sulfate. This addition of anhydrous magnesium sulfate produces no objectionable pickup of magnesium or sulphur in the weld when the resulting mixture is used to form a weld backing for the seam to be welded. Apparently, water contamination of the mixture produces hydrolysis of the boric acid in the putty which causes the mixture to precipitate. If the material is stored in covered containers or in collapsible tubes of metal or other suitable material instead of in open jars or vessels, it apparently may be maintained indefinitely at the desired consistency obtained by mixing the dry ingredients. Because of its sensitivity to moisture, it is desirable to use a hydrocarbon solvent when cleaning brushes used for applying the mixture to the work. It was found that if commercial alcohol is used for this purpose, there is sufficient water in the alcohol retained in the brush to cause the undesired hydrolysis which produces the precipitation above described. We have used xylene as a brush cleaner and find that this completely eliminates the difficulties arising from the use of alcohol as a brush cleaner.

We have determined that if tantalum hydride is properly held in place along the back of a welding seam, it will provide the desired hydrogen backing at the point of welding. For example, we have applied powdered tantalum hydride to the back of the welding seam by first applying a fiber glass tape to the work, then a layer of tantalum hydride which is held in place on the fiber glass tape by a covering of impregnated asbestos tape which is non-porous and keeps the hydride in place, excludes air from the joint, and forces the liberated hydrogen to go through the weave of the glass tape to protect the molten weld metal. The weld obtained when using this arrangement is a perfect example of hydrogen backing, the weld metal along the back of the weld being silver white with good penetration and feathered edges. When the tape was removed after the welding operation, it was found that the hydride was still reacting, glowing like a charcoal fire, thus indicating that it had used up all the oxygen in the confined space between the asbestos tape and the weld. Thus, although tantalum hydride, when held in place along the back of the seam by mechanical means other than silicone putty, will give the desired results, the cost and lack of convenience in using tantalum hydride under such circumstances will generally be prohibitive of its use for most welding applications. Thus, the need for a dispersion medium for the tantalum hydride, such as silicone bouncing putty, becomes important. The dispersion medium, however, must have certain characteristics such as noted above namely, adhesive qualities at welding temperature, decomposition without imparting carbon pickup to the weld, ease of application before welding such as by painting, and effective in itself to protect the back of the weld from oxidation during welding. These attributes are all possessed by silicone bouncing putty.

We have determined that titanium hydride cannot be used as a substitute for tantalum hydride in our weld backing. Titanium hydride as an ingredient of our coating composition is very unsatisfactory. It forms a heavy scum on the top surface of the weld and also causes instability of the welding arc when performing arc welding operations. Furthermore, it cannot be used in percentages as great as those which it is possible to use when employing tantalum hydride. It may be that the reason that tantalum hydride is effective as a weld backing material is due to its high dissociation temperature or the higher melting point of metallic tantalum and its retention of hydrogen at high temperatures. We have, however, been unable to determine or find information which would confirm this belief since the properties of both of these hydrides are essentially unknown at the high temperatures associated with the welding operation. The fact remains, however, that tantalum hydride secures the desired results which are not obtained when using titanium hydride.

From the above considerations, it is believed to be apparent that silicone bouncing putties, other than the particular one specified, may be employed alone or in combination with tantalum hydride in practicing our invention. These silicone bouncing putties may have other fillers than the lithopone above referred to and certain ingredients of the particular silicone bouncing putty above specified such as glycerol and the red iron oxide for coloring, may be omitted.

It is also apparent that our backing material is not limited in its use to arc welding but may also be used when practicing other forms of welding such as gas welding. Although particularly suited for backing seams between parts of stainless steel it may be used as a backing for parts of carbon steel or of low alloy steel. It is believed to have its greatest utility in connection with the welding of ferrous metals although of course it is not limited thereto. Our backing may be used when welding pipes or objects having irregular contours or small internal clearances where it would otherwise be difficult or impossible to secure the desired hydrogen backing by using jigs or other means to supply the desired hydrogen backing, and it would be difficult or impossible to remove the residue of other backing materials after welding. As previously noted our backing material is reduced to an ash which is readily separated from the work since it has no fused ingredients which tenaciously cling to the work after the welding operation has been performed. Many other uses of our backing material will suggest themselves to those skilled in the art of welding.

What we claim as new and desire to secure by Letters Patent of the United States is:

1. A weld backing consisting essentially of powdered tantalum hydride 11–13 grams and silicone bouncing putty 28–32 grams, said silicone bouncing putty being a homogeneous mixture of substantially the following composition:

| Silicone gum: | Percent by weight of gum used |
|---|---|
| Lithopone | 15 |
| Glycerol | 2 |
| Pentaerythritol | 1 |
| Ferric stearate | 2 | and said silicone gum of said composition being the product of reaction under heat of the following ingredients:

| Dimethyl silicone oil: | Percent by weight of oil used |
|---|---|
| Partially dehydrated boric acid | 7 |
| $FeCl_3.6H_2O$ | 0.1 |

2. A coating composition for use in forming weld backings, said composition consisting essentially of powdered tantalum hydride 11–13 grams, silicone bouncing putty 28–32 grams, and a solvent for the silicone putty 70–80 milliliters, said silicone bouncing putty being a homogeneous mixture of substantially the following composition:

| Silicone gum: | Percent by weight of gum used |
|---|---|
| Lithopone | 15 |
| Glycerol | 2 |
| Pentaerythritol | 1 |
| Ferric stearate | 2 | and said silicone gum of said composition being the heat reaction product of the following ingredients:

| Dimethyl silicone oil: | Percent by weight of oil used |
|---|---|
| Partially dehydrated boric acid | 7 |
| $FeCl_3.6H_2O$ | 0.1 |

3. The method of welding comprising the steps of placing edges of the parts to be joined in juxtaposition to form a seam, applying a coating comprising a self-supporting dimethyl silicone compound which possesses resiliency and plasticity along the back surfaces of the parts adjacent the seam, and heating the parts at the seam to fuse their juxtaposed edges to form a weld therebetween.

4. A coating composition for use in forming weld backings, said composition comprising (1) tantalum hydride, (2) a plastic reaction product of dimethylpolysiloxane and a compound selected from the group consisting of boron oxide and boric acids, and (3) a solvent for said product, said composition containing less than two-tenths of one percent of water.

5. A coating composition for use in forming weld backings, said composition comprising in proportion, tantalum hydride 11–13 grams, (2) a plastic reaction product of dimethylpolysiloxane and a compound selected from the group consisting of boron oxide and boric acids 28–32 grams, and (3) a solvent for said product 70–80 milliliters.

6. A weld backing comprising powdered tantalum hydride in a dispersion medium of a self-supporting, resilient and plastic reaction product of dimethylpolysiloxane and a compound selected from the group consisting of boron oxide and boric acids.

7. A weld backing comprising a mixture of powdered tantalum hydride and a self-supporting, resilient and plastic reaction product of dimethylpolysiloxane and a compound selected from the group consisting of boron oxide and boric acids, the weight of said product being about two and one-half times the weight of the tantalum hydride.

8. A weld backing for minimizing oxidation of the back juxtaposed edges of a pair of members being welded comprising (1) a layer of tantalum hydride for causing evolution of hydrogen gas when said hydride is subjected to the heat of the weld, and (2) a layer of the reaction product of dimethylpolysiloxane and a compound selected from the group consisting of boron oxide and boric acids superimposed upon and for supporting said tantalum hydride layer adjacent said juxtaposed edges for protecting them from the surrounding atmosphere, thereby forming a gas backing for the molten weld metal.

9. A method of welding comprising the steps of placing edges of the parts to be joined in juxtaposition to form a seam therebetween, painting a coating composition comprising a self-supporting layer of a reaction product of dimethylpolysiloxane and a compound selected from the group consisting of boron oxide and boric acids having tantalum hydride dispersed therein along the back surfaces of the parts adjacent said seam, and heating the parts at the seam to liberate nascent hydrogen from said tantalum hydride and to fuse their juxtaposed edges.

References Cited in the file of this patent

UNITED STATES PATENTS

| 1,679,702 | Wysong | Aug. 7, 1928 |
| 2,145,009 | Keir | Jan. 24, 1939 |
| 2,168,185 | Alexander | Aug. 1, 1939 |
| 2,320,700 | Kent et al. | June 1, 1943 |
| 2,393,906 | Hensel et al. | Jan. 29, 1946 |
| 2,412,065 | Rudy et al. | Dec. 3, 1946 |
| 2,433,296 | Schaefer | Dec. 23, 1947 |
| 2,434,321 | Kleiner et al. | Jan. 13, 1948 |
| 2,467,853 | Poskitt et al. | Apr. 19, 1949 |
| 2,473,887 | Jennings et al. | June 21, 1949 |
| 2,494,920 | Warrick | Jan. 17, 1950 |
| 2,541,851 | Wright | Feb. 13, 1951 |
| 2,561,565 | Edson | July 24, 1951 |

OTHER REFERENCES

Pearsall et al.: M. I. I. Research Lab. Electronics Technical Report No. 104, Apr. 5, 1949, pages 1–3.